(12) United States Patent
Funakawa (10) Patent No.: US 12,523,989 B2
(45) Date of Patent: Jan. 13, 2026

(54) PRODUCT INFORMATION DETERMINING METHOD, MANUFACTURING METHOD, SYSTEM AND PRODUCT INFORMATION DETERMINING DEVICE

(71) Applicant: JFE STEEL CORPORATION, Tokyo (JP)

(72) Inventor: Yoshimasa Funakawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 643 days.

(21) Appl. No.: 17/906,346

(22) PCT Filed: Mar. 17, 2021

(86) PCT No.: PCT/JP2021/010936
§ 371 (c)(1),
(2) Date: Sep. 15, 2022

(87) PCT Pub. No.: WO2021/193309
PCT Pub. Date: Sep. 30, 2021

(65) Prior Publication Data
US 2023/0145099 A1    May 11, 2023

(30) Foreign Application Priority Data

Mar. 23, 2020 (JP) ................................ 2020-051838

(51) Int. Cl.
*G05B 19/418* (2006.01)
*G05B 19/4093* (2006.01)

(52) U.S. Cl.
CPC ... *G05B 19/4183* (2013.01); *G05B 19/40932* (2013.01)

(58) Field of Classification Search
USPC ......................................................... 700/147
See application file for complete search history.

(56) References Cited

U.S. PATENT DOCUMENTS

2020/0024712 A1    1/2020   Iwamura
2021/0326755 A1*   10/2021  Hashimoto ............ G06N 20/00

FOREIGN PATENT DOCUMENTS

CN    105598178 A    5/2016
CN    109843460 A    6/2019
(Continued)

OTHER PUBLICATIONS

JP_2017528790_A (Year: 2017).*
(Continued)

*Primary Examiner* — Hien D Khuu
(74) *Attorney, Agent, or Firm* — KENJA IP LAW PC (57) ABSTRACT

A method and device capable of calculating required material properties from a part shape, and determining a set of manufacturing conditions for a material satisfying the material properties are provided. A product information determining method includes a property acquisition step (S300) for acquiring, based on input information including shape data on a part, material properties required to work a material of the part into the part; and a product information determination step (S400) for determining product information including chemical compositions and a set of manufacturing conditions to manufacture the material satisfying the material properties.

11 Claims, 6 Drawing Sheets

(56) References Cited

FOREIGN PATENT DOCUMENTS

| JP | H05269646 | A | 10/1993 |
| JP | H11290948 | A | 10/1999 |
| JP | 2002049629 | A | 2/2002 |
| JP | 2003030249 | A | 1/2003 |
| JP | 6314626 | B2 | 4/2018 |
| WO | 9610220 | A1 | 4/1996 |
| WO | 2019049856 | A1 | 3/2019 |

OTHER PUBLICATIONS

JP_2004182839_A (Year: 2004).*
WO_2016056129_A1 (Year: 2016).*
JP H07-302354 A (Year: 1995).*
Jun. 15, 2021, International Search Report issued in the International Patent Application No. PCT/JP2021/010936.
Apr. 17, 2025, Office Action issued by the China National Intellectual Property Administration in the corresponding Chinese Patent Application No. 202180015368.3 with English language search report.
Shen Qi-Yu et al., Fast finite element analysis for sheet metal forming, Chinese Journal of Computational Mechanics, May 2000, vol. 17, No. 2.
Wang Ye et al., Research on the Application of Reverse Method in Blank Design of Sheet Metal Forming, Forging and Stamping Technology, 2001, No. 1.

* cited by examiner

BEFORE DEFORMATION PROCESS

AFTER DEFORMATION PROCESS

FIG. 6

PRODUCT INFORMATION DETERMINING METHOD, MANUFACTURING METHOD, SYSTEM AND PRODUCT INFORMATION DETERMINING DEVICE

TECHNICAL FIELD

This disclosure relates to a product information determining method, a manufacturing method, a system, and a product information determining device.

BACKGROUND

When parts are to be manufactured by working metal materials such as steel, material properties required of each part are considered between a product manufacturer who orders the part and a parts manufacturer (material manufacturer) in order to optimize a material to compose the part, and the material is determined. This consideration must take into account not only material properties required as the performance of the finished part, but also material properties required to work the material into the part.

For example, in a case in which an automobile manufacturer requests a steel manufacturer to consider a steel sheet for a part that makes up an automobile, the automobile manufacturer can provide the steel manufacturer with strength required of the part when the part is assembled into the automobile. However, it is difficult to appropriately prescribe material properties such as elongation and stretch flangeability, which are necessary for press working of the steel sheet. The easiest way to do this is to specify, from the steel manufacturer's catalog, a product that meets all the properties deemed necessary. However, selecting, from a limited product lineup, the product that simultaneously meets the multiple material properties such as strength, elongation, stretch flangeability, and corrosion resistance required of the new part causes prominence of any of the material properties, thus resulting in excessive quality.

Furthermore, there are an increasing number of cases in which difficult-to-form parts with complex shapes and higher-strength materials than before are applied, which are difficult to handle with catalog products from steel manufacturers. In reality, based on a schematic part shape indicated by the automobile manufacturer, the steel manufacturer's engineer empirically determines mechanical properties required to form the part, and modifies a catalog product to reduce excess quality. With regard to formability, there are also some technologies that use computer simulation to determine formability (for example, Patent Literature 1). In each case, however, in addition to trial and error in the development of a material on the steel manufacturer's side, repeated trial and error in forming simulation and actual pressing on the automobile manufacturer's side are required before the new part is finally completed.

CITATION LIST

Patent Literature

PTL 1: JP 6314626 B2

SUMMARY

Technical Problem

However, there are multiple required properties, including material properties required for working as well as material properties required as a part, and it is difficult to optimize the balance of the properties. The reason why chemical compositions are designed by experience, or appropriate chemical compositions are determined by experiments by changing chemical compositions one by one and further these properties are extracted under a set of manufacturing conditions is that it is a method of focusing on one property and then balancing the other properties. In addition, in the conventional technology, a material is often determined from a steel manufacturer's catalog, focusing only on the formability of the part, which may cause various problems. For example, with the conventional technology, there is a risk of excessive quality, except in a portion where the highest material properties are required to form the part. Similarly, the excessive quality is also caused by, to meet one material property, raising the other material properties at the same time. In the conventional technology, there are cases in which the other material properties required of the part (e.g., yield stress of the part) than the formability are not taken into account. Specifically, in the case of an automobile part, for example, after an automobile is completed, an area having the part with insufficient yield stress sometimes occurs. In this case, it is necessary to change the material or attach a reinforcing member to the area.

In other words, in order to satisfy both the part properties and the formability of the material at the same time, the material with excessive quality has to be provided, or the additional reinforcing member has to be attached when the part properties are insufficient. In addition, in order to eliminate any excessive quality, trial and error have to be repeated. Furthermore, the repeated trial and error could prolong the time required to complete the part.

As described above, there is room for improvement with respect to a method of selecting a material that satisfies material properties. In addition, technology for efficiently determining a set of manufacturing conditions and the like for the material that satisfies the material properties is also desired.

It would be helpful to provide a product information determining method, a manufacturing method, a system, and a product information determining device that can derive necessary material properties from a part shape and can determine product information such as a set of manufacturing conditions for a material satisfying the material properties.

Solution to Problem

A product information determining method according to one embodiment of the present disclosure includes:
- a property acquisition step for acquiring, based on input information including shape data on a part, a material property required to work a material of the part into the part; and
- a product information determination step for determining product information including a chemical composition and a set of manufacturing conditions to manufacture the material satisfying the material property acquired in the property acquisition step.

A manufacturing method of a sheet according to one embodiment of the present disclosure is a method for manufacturing the sheet for the part, based on the product information determined by the product information determining method described above.

A system for manufacturing a sheet according to one embodiment of the present disclosure manufactures the sheet by the manufacturing method described above.

A product information determining device according to one embodiment of the present disclosure is a product information determining device including a controller configured to:
acquire, based on input information including shape data on a part, a material property required to work a material of the part into the part; and
determine product information including a chemical composition and a set of manufacturing conditions to manufacture the material satisfying the material property.

Advantageous Effect

According to the product information determining method, manufacturing method, system, and product information determining device of the embodiment of the present disclosure, it is possible to determine, from the part shape, the material property required of the material, and efficiently determine the set of conditions for manufacturing the sheet.

BRIEF DESCRIPTION OF THE DRAWINGS

In the accompanying drawings.

DETAILED DESCRIPTION

Figure 1:
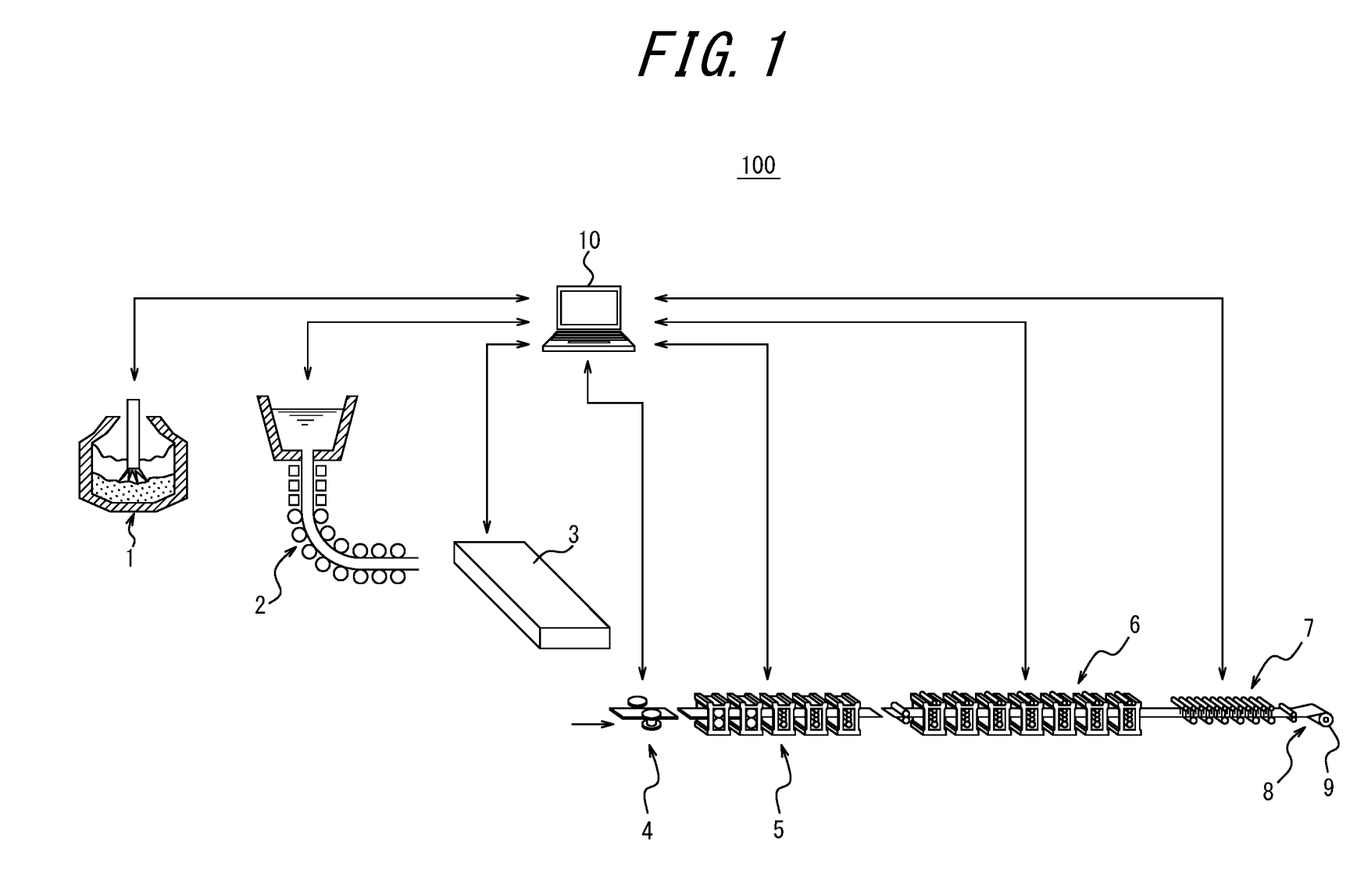
FIG. 1 is a diagram illustrating a schematic configuration of a system according to one embodiment of the present disclosure.

An embodiment of the present disclosure will be described below, with reference to the drawings.
In the drawings, the same or corresponding portions are denoted by the same reference numerals. In the descriptions of the present embodiment, detailed descriptions of the same or corresponding portions are omitted or simplified, as appropriate.
FIG. 1 is a schematic diagram illustrating an overview of a system 100 including a product information determining device 10 according to the embodiment of the present disclosure. The following describes an example in which a design object is a steel sheet, but the design object is not limited to the steel sheet. The steel sheet can be a hot-rolled steel sheet, a cold-rolled steel sheet, or a plated steel sheet. For example, the design object may be another metal sheet, such as an aluminum alloy sheet, a titanium sheet, or a magnesium sheet. The design object may be anything other than the metal sheet, for example, a sheet-shaped object of carbon fiber reinforced plastic, carbon fiber braids, or the like. A case is described in which the system 100 is used by a material manufacturer (in this case, a steel manufacturer) that receives an order from a product manufacturer (for example, an automobile manufacturer). In outline, in the disclosure, the material manufacturer acquires accurate shape data on a part (e.g., three-dimensional data on the part), for example, from the product manufacturer. One of points of focus of the disclosure is that part information is unevenly distributed in the product manufacturer who uses the part, and material information is unevenly distributed in the material manufacturer who designs and manufactures a material for the part. In other words, one of features of the disclosure is the use of the shape data on the part, which is conventionally available only to the product manufacturer. In the disclosure, by developing the part of a certain shape into a material sheet, in other words, by back-calculating deformation process of the material, properties for working required of the material and part properties, such as strength, required in a state of the material are accurately acquired. The accurate acquisition of property information enables prevention of excessive quality and the like, prevention of cost increases, prevention of excessive trial-and-error, and shortening a development and design period.

As illustrated in FIG. 1, the system 100 according to the present embodiment includes a converter 1, a continuous casting machine 2, a heating furnace 3, a scale breaker 4, a rougher 5, a finisher 6, an accelerated cooling device 7, a winder 8, a product steel strip 9, and the product information determining device 10. In a steel sheet manufacturing process, iron ore material is first charged into a blast furnace together with limestone and coke to produce pig iron in a molten state. The pig iron from the blast furnace is adjusted for carbon and other chemical compositions in the converter 1, and final chemical composition adjustment is made by secondary refining. In the continuous casting machine 2, the refined steel is cast to produce an intermediate material called a continuous-cast steel (slab). The slab is then heated by the heating furnace 3 in a heating step. The heated slab undergoes a hot rolling step by the rougher 5 and the finisher 6, a cooling step by the accelerated cooling device 7, and is wound by the winder 8 into the product steel strip 9. The manufacturing process may include another processing step such as an acid cleaning step, a cold rolling step, an annealing step, or a plating process, as appropriate, after the cooling step. In outline, the system 100 according to the present embodiment manufactures a steel plate based on product information determined by the product information determining device 10. Here, the product information includes chemical compositions and a set of manufacturing conditions to manufacture the steel sheet, as a material.

Figure 2:
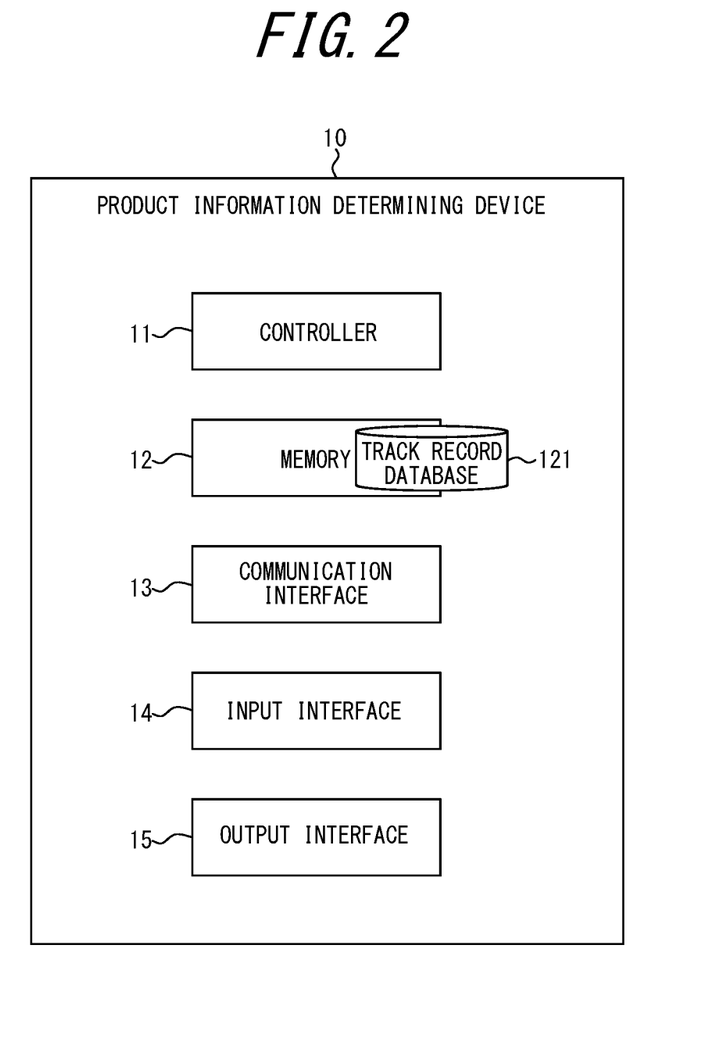
FIG. 2 is a block diagram of a product information determining device according to the embodiment of the present disclosure.

FIG. 2 illustrates a block diagram of the product information determining device 10 according to the embodiment of the present disclosure. The product information determining device 10 includes a controller 11, a memory 12, a communication interface 13, an input interface 14, and an output interface 15. In outline, the product information determining device 10 acquires material properties required for working into a part, based on input information including shape data and part strength of the part to be manufactured. The product information determining device 10 determines, based on a track record database 121, product information including chemical compositions and a set of manufacturing conditions to manufacture a material that satisfies the material properties. The track record database 121 is a database that stores correspondences between track record data on product information and track record data on material properties. For example, the track record database 121 has records including the track record data on the product information and the track record data on the material properties. The data to be stored in the track record database 121 is collected by an appropriate method. For example, such data may be collected from the entire length of a coil or from a portion of the coil. Such data may be collected off-line or in-line. When the data is collected in-line, the required material properties may be measured directly or indirectly. For example, mechanical properties, texture, and the like may be measured by magnetic means, hardness measurement, X-rays, neutron measurement, and the like, and the material properties may be acquired from the obtained results.

The controller 11 includes at least one processor, at least one dedicated circuit, or a combination thereof. The processor is a general-purpose processor such as a central processing unit (CPU) or a dedicated processor specialized for a particular process. The dedicated circuit is, for example, a Field-Programmable Gate Array (FPGA) or an Application Specific Integrated Circuit (ASIC). The controller 11 executes processes related to operations of the product information determining device 10, while controlling each component of the product information determining device 10.

The memory 12 includes at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 12 functions as, for example, a main memory, an auxiliary memory, or a cache memory. The memory 12 stores data to be used for the operations of the product information determining device 10 and data obtained by the operations of the product information determining device 10. For example, the memory 12 stores the track record database 121 described above.

The communication interface 13 includes at least one interface for communication. The interface for communication can be, for example, a LAN interface, a WAN interface, an interface corresponding to mobile communication standards such as LTE (Long Term Evolution), 4G (4th generation), or 5G (5th generation), or an interface corresponding to short-range wireless communication such as Bluetooth (registered trademark). The communication interface 13 receives data to be used for the operations of the product information determining device 10, and transmits data obtained by the operations of the product information determining device 10.

The input interface 14 includes at least one interface for input. The interface for input is, for example, a physical key, a capacitive key, a pointing device, a touch screen integrally provided with a display, or a microphone. The input interface 14 accepts an operation for inputting data to be used for the operations of the product information determining device 10. The input interface 14 may be connected to the product information determining device 10 as an external input device, instead of being included in the product information determining device 10. As a connection method, any method such as, for example, Universal Serial Bus (USB), High-Definition Multimedia Interface (HDMI; registered trademark), or Bluetooth (registered trademark) can be used.

The output interface 15 includes at least one interface for output. The interface for output is, for example, a display or a speaker. The display is, for example, a liquid crystal display (LCD) or an organic electro luminescence (EL) display. The output interface 15 outputs data obtained by the operations of the product information determining device 10. The output interface 15 may be connected to the product information determining device 10 as an external output device, instead of being included in the product information determining device 10. As a connection method, any method such as, for example, USB, HDMI (registered trademark), or Bluetooth (registered trademark) can be used.

The functions of the product information determining device 10 are implemented by executing a program according to the present embodiment by the processor corresponding to the controller 11. In detail, the functions of the product information determining device 10 are realized by software. The program causes a computer to execute the operations of the product information determining device 10, thereby causing the computer to function as the product information determining device 10. In detail, the computer executes the operations of the product information determining device 10 in accordance with the program to thereby function as the product information determining device 10.

In the present embodiment, the program can be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a Digital Versatile Disc (DVD) or a Compact Disc Read Only Memory (CD-ROM) on which the program is recorded. The program may also be distributed by storing the program in a storage of a server and transmitting the program from the server to another computer. The program may be provided as a program product.

In the present embodiment, a computer temporarily stores in a main memory, for example, the program recorded on a portable recording medium, or the program transferred from a server. Then, the computer reads the program stored in the main memory using a processor, and executes processes in accordance with the read program using the processor. The computer may read the program directly from the portable recording medium, and execute processes in accordance with the program. Each time the computer receives the program from the server, the computer may sequentially execute processes in accordance with the received program. Instead of transferring the program from the server to the computer, processes may be executed by a so-called application service provider (ASP) type service, which realizes functions only by execution instructions and result acquisitions. The program encompasses information that is to be used for processes by an electronic computer and is thus equivalent to a program. For example, data that is not a direct command to a computer but has a property that regulates processing of the computer is "equivalent to a program" in this context.

Some or all of the functions of the product information determining device 10 may be realized by a dedicated circuit corresponding to the controller 11. In detail, some or all of the functions of the product information determining device 10 may be realized by hardware.

Figure 3:
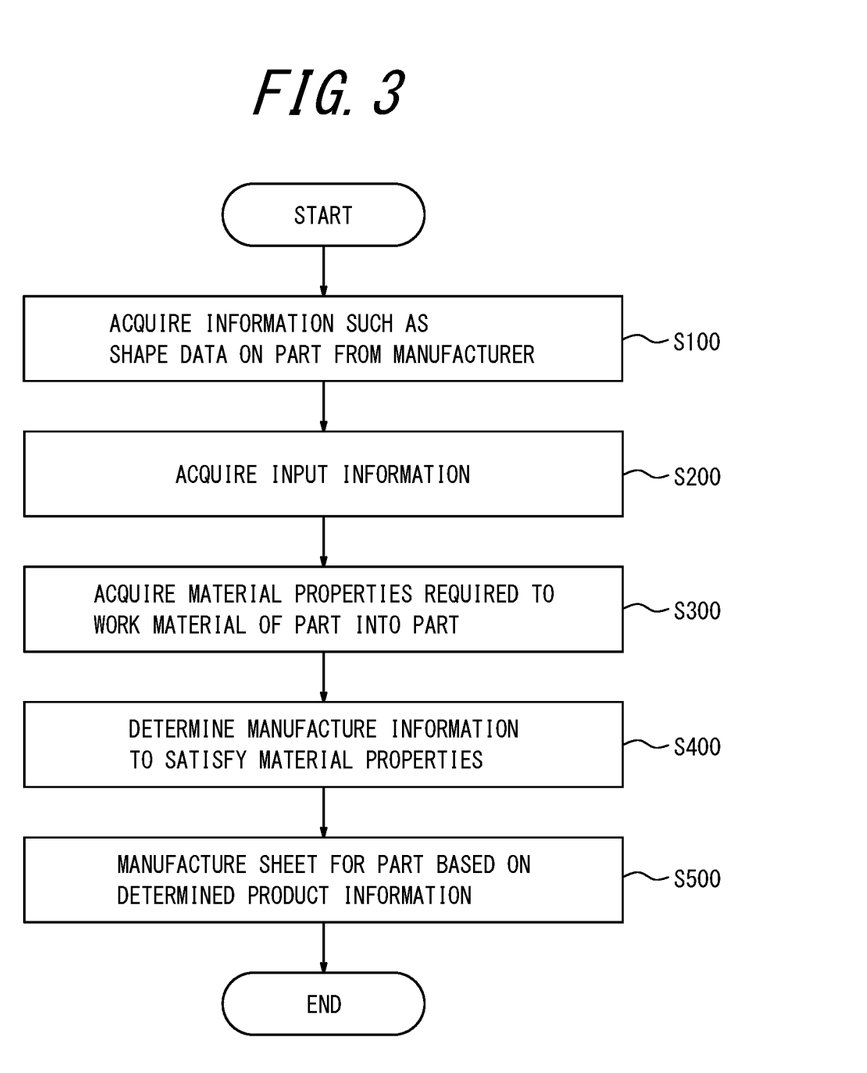
FIG. 3 is a flowchart illustrating a product information determining method according to the embodiment of the present disclosure.

Next, information processing performed by the product information determining device 10 according to the embodiment of the present disclosure will be described. FIG. 3 is a flowchart illustrating a product information determination method according to the embodiment of the present disclosure.

First, information such as shape data on a part is acquired from a product manufacturer (automobile manufacturer or the like) that requires the part (step S100). Specifically, a material manufacturer acquires accurate three-dimensional data from the product manufacturer, for example. Any method can be adopted to acquire the three-dimensional data. For example, the product manufacturer may provide encrypted three-dimensional data to the material manufacturer. In this case, the product information determining device 10 has the functions of decrypting the encrypted three-dimensional data and deleting the encrypted three-dimensional data as soon as the data is used in processing of step S200. In this way, when the three-dimensional data is unpublished data, the three-dimensional data can be safely protected and concealed.

Next, the controller 11 of the product information determining device 10 acquires input information including the shape data on the part (step S200). The controller 11, for example, acquires the input information accepted based on an input operation from the input interface 14. As the shape data on the part, for example, an input of the three-dimensional data is accepted by the input interface 14. The three-dimensional data may be information designed by a CAD system, or may be data obtained by measuring the three-dimensional shape of a small or full-scale model. The shape data may be two-dimensional data. In this case, the shape data may also include data on a sheet thickness. Furthermore, the shape data may include data on part strength (for example, yield stress of the part when the part is plastically deformed), and the data on the part strength is accepted, for example, by accepting an input operation of the strength data by the input interface 14.

Next, the controller 11 acquires, based on the acquired input information, material properties required for working into the part by back-calculating a deformation process in which a material of the part is worked into the shape of the part (step S300). The material properties required for working into the part include mechanical properties of a sheet required to form the part by press forming, and specifically include properties related to plastic deformation. The properties related to plastic deformation include at least one of tensile strength, elongation, Lankford value, bending, hole expansion ratio indicating stretch flangeability, and limit bending radius. The properties related to plastic deformation are not limited to these. To acquire such material properties, a linear model, a regression model, a neural network, or another model may be generated. In this case, the controller 11 acquires the material properties required for working into the part by entering input information into the model. Alternatively, in a case in which there is sufficient data related to input information and material properties, the controller 11 may retrieve the material properties corresponding to the input information in the data. In addition, the material properties required for working into the part may include yield stress.

Figure 4:
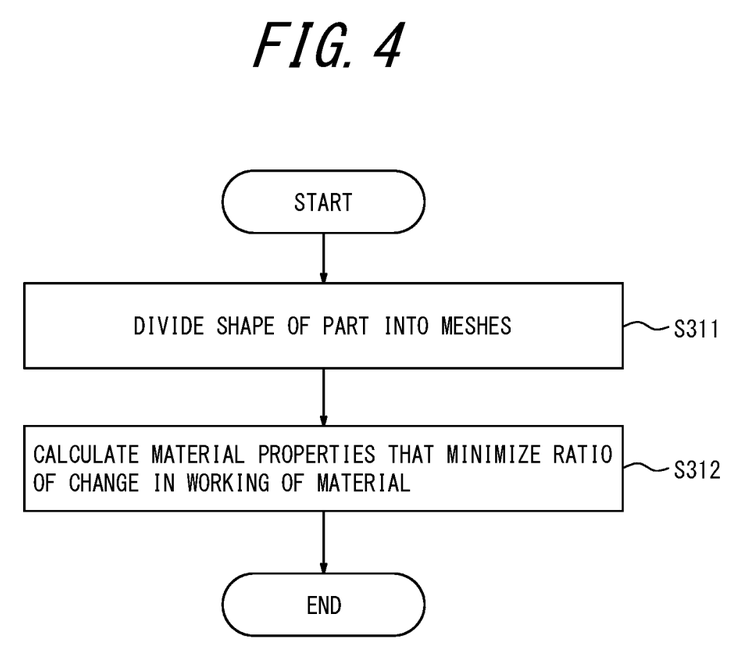
FIG. 4 is a flowchart illustrating an example of processing in a property acquisition step.
Figure 5:
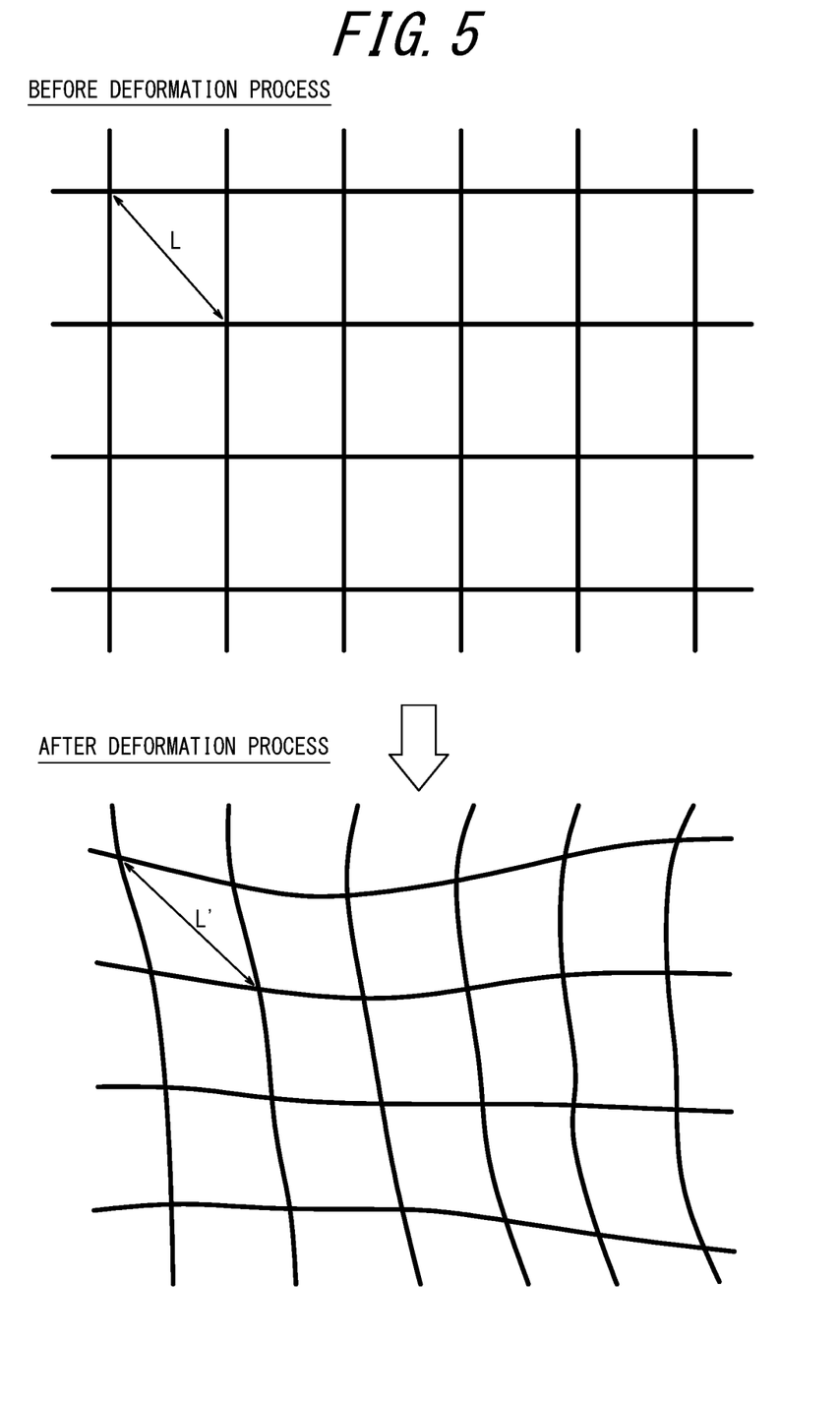
FIG. 5 is a schematic diagram illustrating a ratio of change.

In a case in which there are multiple solution patterns of the material properties to the input information, the controller 11 acquires the material properties based on an evaluation value (objective function). FIG. 4 illustrates a flowchart of an example of processing of the property acquisition step in this case. The controller 11 divides the shape of the part in the three-dimensional data into meshes (step S311). The controller 11 back-calculates the deformation process of the material to obtain the ratio of change in the working of the material. In other words, the controller 11 traces a pressing process, which consists of multiple stages, backward in time to determine the ratio of change in the working of the material. The "ratio of change in the working of the material" is defined, for example, by an average ratio of change in the distance between mesh points when the shape of the part is divided into a mesh. FIG. 5 is a conceptual diagram of such a ratio of change. FIG. 5 illustrates a change in distance between a certain grid point in the mesh and a grid point located at a diagonal corner of the grid point. Here, L represents a distance before the deformation process, and L' represents a distance after the deformation process. The ratio of change in the distance between the grid points is expressed as L'/L. The ratio of change in the working of the material may then be determined, for example, by an average of the ratio of change for all adjacent grid points. Referring again to FIG. 4, the controller 11 acquires the material properties that reduce, or specifically minimize, the ratio of change in the working of the material (step S312). In other words, the controller 11 acquires the material properties based on the ratio of change in the working of the material. In this way, the solutions of the material properties can be narrowed down to one.

In FIG. 4, the controller 11 uses the ratio of change in the working of the material as an evaluation value, but is not limited to this. For example, in addition to the ratio of change in the working of the material, the controller 11 may use a blank area in pressing as an evaluation value, with the condition that the blank area is also reduced, specifically minimized. In other words, the controller 11 may acquire the material properties based on the blank area. For example, when a minimum blank area is determined, the ratio of change of an outer circumference is also determined, so in this case, the controller 11 may further acquire a hole expansion ratio. By calculating the hole expansion ratio, the controller 11 can acquire a solution that minimizes change in length of a blank outer circumference.

Referring again to FIG. 3, the controller 11 determines, based on the track record database 121, product information including chemical compositions and a set of manufacturing conditions to manufacture a material that satisfies the material properties acquired in step S200 (step S400). The material properties of a material are determined by chemical compositions that make up the material and a set of manufacturing conditions. The set of manufacturing conditions includes forming conditions and heat treatment conditions. In general, yield stress and a set of manufacturing conditions do not correspond one-to-one, but the chemical compositions and the set of manufacturing conditions are uniquely determined by the combination of the material properties acquired in step S200. As described above, the correspondences between track record data on product information and track record data on material properties are stored in the track record database 121. The controller 11 can derive an optimal solution (manufacturing information) to manufacture the part based on the track record database 121. For example, the controller 11 generates, based on the track record database 121, a prediction model based on the correlation between the material properties and the manufacturing information. As the prediction model, a neural network model or a machine learning model by deep learning can be adopted. The controller 11 performs back analysis based on the prediction model to determine the product information. When generating the prediction model, the controller 11 may improve the accuracy of a solution by the prediction model without using an old one. In other words, when generating the prediction model, the controller 11 may improve the accuracy of a solution by the prediction model by using only data before a lapse of a predetermined period. In derivation of the solution using the prediction model, a contribution ratio (coefficient) for each material property may be set as appropriate.

The system 100 controls the converter 1, the continuous casting machine 2, the heating furnace 3, the rougher 5, the finisher 6, the accelerated cooling device 7, and the winder 8 based on the manufacturing information determined by the controller 11, to manufacture a steel sheet for the part (step S500). For example, the controller 11 may transmit the determined manufacturing information via the communication interface 13 to the converter 1, the continuous casting machine 2, the heating furnace 3, the rougher 5, the finisher 6, and the accelerated cooling device 7. The converter 1, the continuous casting machine 2, the heating furnace 3, the rougher 5, the finisher 6, and the accelerated cooling device 7 manufacture the steel sheet for the part, based on the received manufacturing information.

As described above, according to the product information determining device 10 of the embodiment of the present disclosure, the material properties required of the material of the part can be acquired from the input information including the shape data on the part. According to the product information determining device 10, the product information including the chemical compositions and the set of manufacturing conditions to manufacture the material that satisfies the acquired material properties can be determined based on the track record database 121. In other words, according to the product information determining device 10 of the embodiment of the present disclosure, the required material properties can be derived from the part shape, and furthermore the set of manufacturing conditions for the material that satisfies the material properties can be determined. Here, the product information determining device 10 acquires the material properties required of the material of the part from the input information including the shape data on the part, and determines the product information to satisfy the material properties. Therefore, according to the product information determining device 10 of the embodiment of the present disclosure, it is possible to prevent a product from having excessive properties (for example, strength, elongation, and stretch flangeability beyond necessity) and reduce costs due to preventing the excessive use of the material and the like. According to the product information determining device 10 of the embodiment of the present disclosure, the required material properties are acquired from the input information including the shape data on the part acquired from the manufacturer or the like, for example, so it is possible to prevent excessive trial and error.

The present embodiment describes an example in which the system 100 is used in the material manufacturer, but is not limited to this. For example, the system 100 may be used in the product manufacturer. Alternatively, the system 100 may be used jointly in the product manufacturer and the material manufacturer. In either case, t it is possible to prevent the product from having excessive properties and reduce costs due to preventing the excessive use of the material and the like. It also helps to prevent excessive trial and error.

Here, the material properties acquired in step S200 may not include the yield stress. In other words, in step S200, the product information determining device 10 need not acquire yield stress. In this case, in step S300, the product information determining device 10 determines the manufacturing information using part strength, in addition to the material properties. In other words, in step S300, the product information determining device 10 may handle the yield stress of the material obtained from the yield stress of the part, and determine the manufacturing information.

Here, when steel is smelted at a predetermined chemical composition ratio, all chemical compositions cannot always be at desired values. This can occur because a raw material contains unintended chemical compositions as impurities. Therefore, in the middle of a manufacturing step in step S400, the system 100 may update the set of manufacturing conditions as appropriate. Such update processing can compensate for discrepancy in mechanical properties caused by the difference between the calculated optimum chemical compositions and actual chemical compositions. Specifically, the product information determining device 10 uses the actual chemical compositions after chemical composition adjustment as input information, and determines a set of manufacturing conditions as output information based on the track record database 121. For example, when the actual chemical compositions after the chemical composition adjustment vary by more than a predetermined threshold (for example, 1% or more) relative to the chemical compositions determined in step S300, the system 100 may execute the update processing.

In a case in which the steel sheet is manufactured through two or more steps in step S400, actual chemical compositions or the properties of an intermediate product of the former step can be used as input to acquire heat treatment conditions for the next step, in order to manufacture the steel sheet with desired mechanical properties with higher accuracy. For example, in the case of manufacturing a cold-rolled steel sheet, annealing temperature after cold rolling may be determined from chemical composition and hot rolling results.

Specific chemical composition will be described below, using steel as an example. In the following description of the chemical composition, "%" denotes "mass %" unless otherwise specified. Components of the steel are not particularly limited, but preferably contain, in mass %, C: 0.0005% to 1%, Si: 0.005% to 3%, Mn: 0.1% to 30%, P: 0.07% or less, S: 0.01% or less, Al: 3% or less, and N: 0.01% or less. In addition, at least one of Ti, Nb, V, Ni, Cu, Mo, Cr, Sn, and Sb may be added depending on a purpose. The purpose of adding these elements is for improvement in corrosion resistance, chemical convertibility, weldability, and the like. Chemical composition adjustment may be performed in the converter 1 or in an electric furnace. Casting may be casting to ingots or continuous casting. The thickness of the slab may be selected as appropriate from 300 mm to 30 mm. For hot rolling, the slab may be heated, rolled directly after casting without cooling to room temperature, complementarily heated for uniformity of temperature, and reheated to optimum rolling temperature. A coiling temperature after hot rolling should be between 300° C. and 800° C. The hot-rolled sheet can be acid cleaned and refined to make a hot-rolled sheet product. Furthermore, the acid cleaned sheet may be cold rolled into a product, and annealing or heating and cooling heat treatment may be performed after cold rolling. The obtained cold-rolled sheet may be shaped into a product by temper rolling and leveling. An annealing step may also be included after hot rolling. Annealing of the hot-rolled or cold-rolled sheet can be either box annealing or continuous annealing. The surface of a steel sheet may be hot-dip galvanized or zinc electroplated in a normal step, or this step may be performed multiple times in combination. The content of each chemical composition in the above suitable chemical composition will be described.

C: 1% or Less

C is an element that controls the strength of steel. When a C content exceeds 1%, cementite precipitates coarsely on a grain boundary, resulting in reduced formability. For this reason, the upper limit of the C content should be 1% or less.

Si: 3% or Less

Si is added to suppress precipitation of cementite or to refine cementite. An Si content exceeding 3% causes embrittlement and lower formability, so the upper limit of the Si content should be 3% or less.

Mn: 30% or Less

Mn acts as a hardenability element and suppresses the precipitation of coarse cementite. Adding Mn by 5% or more can form more retained austenite γ, which also improves ductility. However, the upper limit of an Mn content should be 30% or less, because formability is adversely affected when the Mn content exceeds 30%.

P: 0.07% or Less

P embrittles steel. For this reason, the upper limit of a P content should be 0.07% or less.

S: 0.01% or Less

S forms MnS and degrades formability. Therefore, the upper limit of an S content should be 0.01%.

Al: 3% or Less

Al fixes N as AlN and improves formability. Adding a large amount of Al can form retained austenite 7 and improve formability. On the other hand, an Al content exceeding 3% causes embrittlement due to formation of intermetallic compounds, so the upper limit of the Al content should be 3% or less.

N: 0.01% or Less

When N is dissolved in steel, formability decreases. In addition, a high content of N forms large amounts of nitrides, such as AlN, and reduces formability. Therefore, the upper limit of the N content should be 0.01% or less.

Ti: 0.5% or Less

Ti increases the strength of steel by forming carbides and nitrides. However, when a Ti content exceeds 0.5%, coarse precipitates are formed and formability is reduced. For this reason, the upper limit of the Ti content should be 0.5% or less.

Nb: 0.5% or Less

Nb increases the strength of steel by forming carbides and nitrides. However, when an Nb content exceeds 0.5%, coarse precipitates are formed and formability is reduced. For this reason, the upper limit of the Nb content should be 0.5% or less.

V: 3% or Less

V increases the strength of steel by forming carbides and nitrides. However, when a V content exceeds 3%, coarse precipitates are formed and formability is reduced. For this reason, the upper limit of the V content should be 3% or less.

Mo: 1% or Less

Mo can be added to increase strength and suppress precipitation of cementite. The upper limit of a Mo content should be 1% or less, because the addition of Mo by more than 1% reduces formability due to coarse Mo carbides.

Cr: 40% or Less

Cr can be added to increase corrosion resistance. However, when a Cr content exceeds 40%, embrittlement layers such as sigma phase are precipitated and formability is reduced. For this reason, the upper limit of the Cr content should be 40% or less.

Ni: 20%

Ni can also be added to improve corrosion resistance. An Ni content exceeding 20% reduces formability due to formation of intermetallic compounds, so the upper limit of the Ni content should be 20% or less.

EXAMPLE

Figure 6:
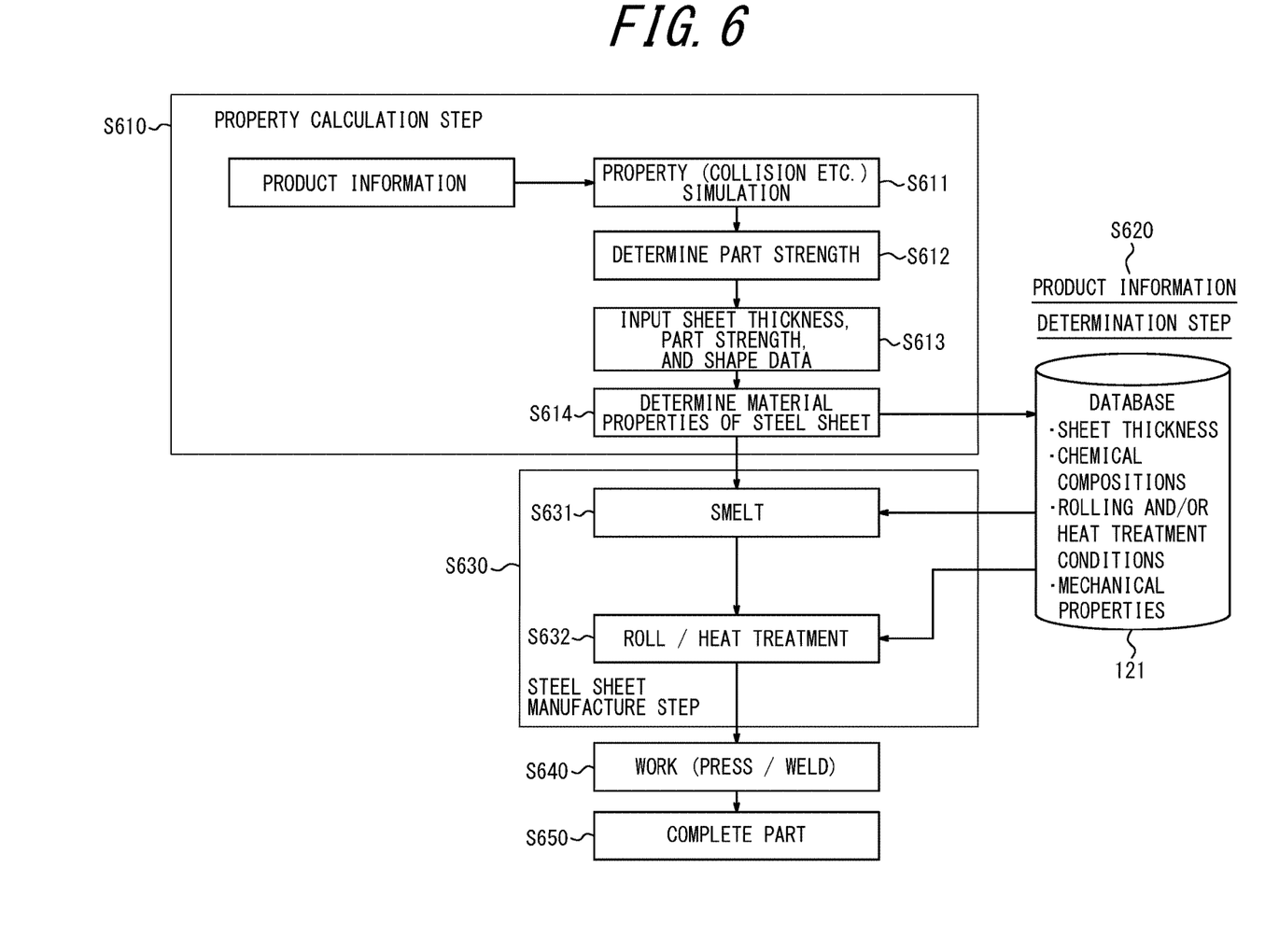
FIG. 6 is a diagram illustrating an overview of processing according to the embodiment of the present disclosure.

Processing according to the embodiment of the present disclosure will be described below, but the disclosure is not limited to this example. FIG. 6 illustrates an overview of processing of a system according to the embodiment of the present disclosure. Here, a case in which the system manufactures a part made of a steel sheet, as a material, will be described. The system of FIG. 6 includes a device for press working of the steel sheet, in addition to the configuration of the system 100 described above.

In a property calculation step S610, the system performs a property simulation based on part information (step S611), and determines part strength (step S612). For example, the property simulation includes crash deformation simulation, and the part strength can be determined by the simulation. The system acquires a sheet thickness, the part strength, and shape data as input information (step S613), and determines material properties of a steel sheet based on the input information (step S614). In a subsequent product information determination step S620, the system determines, based on the track record database 121, product information including chemical compositions and a set of manufacturing conditions to manufacture a material that satisfies the material properties acquired in step S614. In a subsequent steel sheet manufacture step S630, the system 100 produces and smelts molten steel whose chemical compositions are adjusted based on the determined product information (step S631). The system 100 then performs rolling and heat treatment based on the determined product information to manufacture the steel sheet (step S632). In step S632, when actual chemical compositions after the chemical composition adjustment vary by 1% or more relative to the chemical compositions determined in step S620, the system updates the rolling and/or heat treatment conditions using the actual chemical compositions after the chemical composition adjustment based on the track record database 121, and manufactures the steel sheet (step S632). The following is processing to be performed in a product manufacturer using the part. The manufactured steel sheet is worked by pressing, welding, and the like (step S640), and the part is completed (step S650).

While the present disclosure has been described with reference to the drawings and examples, it should be noted that various modifications and revisions are easily implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, in the present disclosure, the chemical compositions are determined by considering mechanical properties in press forming, but data on corrosion resistance and chemical convertibility may be combined with the chemical compositions. In other words, in the step of determining the product information, the product information that satisfies additional performance required of the part, in addition to the material properties, may be determined.

This allows achievement of balance between opposing properties. In other words, it is possible to prevent a product from being defective because additional performance (for example, chemical convertibility) of part performances cannot be satisfied, though press forming can be performed thereon.

REFERENCE SIGNS LIST 100 system
1 converter
2 continuous casting machine 3 heating furnace
4 scale breaker
5 rougher
6 finisher
7 accelerated cooling device
8 winder
9 product steel strip
10 product information determining device
11 controller
12 memory
121 track record database
13 communication interface
14 input interface
15 output interface

The invention claimed is:

1. A product information determining method executed by a controller, the method comprising:
  acquiring, based on input information including shape data on a part, a material property required to work a material of the part into the part;
  determining product information including a chemical composition and a set of manufacturing conditions to manufacture the material satisfying the material property;
  transmitting the product information, via a communication interface, to a converter, a continuous casting machine, a heating furnace, a rougher, a finisher, an accelerated cooling device, and a winder; and
  controlling the converter, the continuous casting machine, the heating furnace, the rougher, the finisher, the accelerated cooling device, and the winder to manufacture a steel sheet for the part,
  wherein the material property is acquired by back-calculating a deformation process from the material to a shape of the part and performing a material property acquisition calculation so as to reduce a ratio of change in working of the material, and
  wherein the ratio of change in working of the material is defined by an average ratio of change in the distance between mesh points when the shape of the part is divided into a mesh.

2. The product information determining method according to claim 1, wherein the product information determining method further comprises at least one of following processes (a)-(i):
  (a) a step of acquiring the input information from a product manufacturer,
  (b) wherein in the product information determination step, the product information including the chemical composition and the set of manufacturing conditions to manufacture the material satisfying the material property is determined based on the material property,
  (c) wherein in the product information determination step, the product information is determined based on a track record database storing product information including a chemical composition and a set of manufacturing conditions corresponding to a material property,
  (d) wherein in the property acquisition step, the material property acquisition calculation is performed so as to reduce a blank area in working of the material,
  (e) wherein the material property includes a property related to plastic deformation and a yield stress,
  (f) wherein in the product information determination step, the product information is determined based on a yield stress of the material calculated from a part strength,
  (g) wherein the input information includes a sheet thickness,
  (h) wherein in the product information determination step, the product information is determined by performing back analysis based on a prediction model based on a correlation between a material property, a chemical composition, and a set of manufacturing conditions, and
  (i) wherein in the product information determination step, the product information satisfying an additional performance required of the part, in addition to the material property, is determined.

3. A manufacturing method of a sheet for manufacturing the sheet based on the product information determined by the product information determining method according to claim 2.

4. The manufacturing method according to claim 3, wherein the sheet is a metal sheet.

5. A system for manufacturing a sheet by the manufacturing method according to claim 3.

6. A system for manufacturing a sheet by the manufacturing method according to claim 4.

7. A manufacturing method of a sheet for manufacturing the sheet based on the product information determined by the product information determining method according to claim 1.

8. The manufacturing method according to claim 7, wherein the sheet is a metal sheet.

9. A system for manufacturing a sheet by the manufacturing method according to claim 7.

10. A system for manufacturing a sheet by the manufacturing method according to claim 8.

11. A product information determining device comprising a controller configured to:
  acquire, based on input information including shape data on a part, a material property required to work a material of the part into the part;
  determine product information including a chemical composition and a set of manufacturing conditions to manufacture the material satisfying the material property;
  transmit the product information, via a communication interface, to a converter, a continuous casting machine, a heating furnace, a rougher, a finisher, an accelerated cooling device, and a winder; and
  control the converter, the continuous casting machine, the heating furnace, the rougher, the finisher, the accelerated cooling device, and the winder to manufacture a steel sheet for the part,
  wherein the material property is acquired by back-calculating a deformation process from the material to a shape of the part and performing a material property acquisition calculation so as to reduce a ratio of change in working of the material, and
  wherein the ratio of change in working of the material is defined by an average ratio of change in the distance between mesh points when the shape of the part is divided into a mesh.

* * * * *